United States Patent [19]
King

[11] Patent Number: 6,024,842
[45] Date of Patent: Feb. 15, 2000

[54] DISTILLATION COLUMN DEVICE

[75] Inventor: Leonard Tony King, Long Beach, Calif.

[73] Assignee: Komax Systems, Inc., Wilmington, Calif.

[21] Appl. No.: 09/036,585

[22] Filed: Mar. 6, 1998

[51] Int. Cl.[7] ........................................... B01D 3/00
[52] U.S. Cl. ................ 203/99; 165/145; 165/163; 202/152; 202/185.5; 202/185.6; 202/237; 202/131; 203/100
[58] Field of Search ...................... 203/99, 100; 202/131, 202/152, 185.5, 185.6, 158, 237; 261/114.1; 165/163, 141, 145

[56] References Cited

U.S. PATENT DOCUMENTS

| | | | |
|---|---|---|---|
| 1,425,174 | 8/1922 | Cartter et al. ............................ | 126/639 |
| 2,149,737 | 3/1939 | Jewell ...................................... | 165/145 |
| 2,653,014 | 9/1953 | Sniader .................................... | 165/140 |
| 3,617,699 | 11/1971 | Othmer .................................... | 219/300 |
| 3,729,179 | 4/1973 | Keller ..................................... | 261/114.1 |
| 4,061,184 | 12/1977 | Radcliffe .................................. | 165/38 |
| 4,462,463 | 7/1984 | Gorham, Jr. ............................. | 165/140 |

*Primary Examiner*—Virginia Manoharan
*Attorney, Agent, or Firm*—Malcolm B. Wittenberg

[57] ABSTRACT

A device for distilling a liquid feed which includes a core pipe and a first fluid in a series of helically wound tubes or vanes employing the core pipe as a mandrel. The liquid to be distilled passes over a series of interstices which are created by the helically wound tubes or vanes and a distillate recovered as a consequence.

5 Claims, 4 Drawing Sheets

2

DISTILLATION COLUMN DEVICE

TECHNICAL FIELD OF THE INVENTION

The present invention is directed to a distillation column for enhancing the distillation of a feed liquid. In one embodiment, the device is capable of effecting heat transfer between the device itself and the liquid to be distilled in order to enhance the distillation process.

BACKGROUND OF THE INVENTION

The act of distillation is a well-described unit operation of chemical engineering. Put in its most simplistic terms, distillation involves the vaporization of part of a liquid solution with separation and recovery of the vapor and residue of the solution. Distillation may be carried out as a batch process as shown in FIG. 1. Specifically, feed liquid is contained within a still pot 1 heated by energy source 7 causing the vapor to pass through line 2. The vapor enters heat transfer station 3 whereby a cooling medium enters as inlet 6 and exits at outlet 5 in countercurrent flow to entering vapor 8. As a consequence, the vapor condenses forming distillate 4.

Alternatively, distillation can be carried out in a continuous fashion as shown in FIG. 2. FIG. 2 differs from FIG. 1 only in the continuous feeding of liquid through inlet 9 into the still pot. Not surprisingly, the continuous process shown in FIG. 2 will result in an increase in concentration of component of the feed not converted to vapor and condensed as distillate. In this instance, when steady state operations have been achieved, the vapor composition remains constant. Both equipment designs of FIGS. 1 and 2 are effective only when the relative volatility among components is large.

Modern distillation equipment uses a rectifying column to achieve high mass transfer rates. Schematically, such a column is shown in FIG. 3 as element 20. The column contains perforated trays 21, 22 etc. or plates designed to allow the passage of liquid and vapor and produces large interfacial areas between vapor and liquid. As noted, liquid 24 is heated by reboiler 31 so that its vapor enters distillation column 20 at plate 21. These various trays or plates can incorporate devices called bubble caps to enhance contacting of liquid and vapor. Alternatives to trays include a large variety of proprietary shapes of packing materials such as Raschig rings, Lessing rings, Pall rings, Berl saddles and Tellerettes. As vapor from the feed liquid passes through the various plates or trays, it exits the top of the column through line 27 and enters a cooler or condensing area whereby a portion of the distillate can be removed through line 28 while a portion is recycled as liquid to pass through the column countercurrent to the vertically ascending vapor. Although FIG. 3 shows the feed entering the column at its lowest point, in operation, the feed can be introduced anywhere along the column depending upon various well-known parameters. As noted, condensed liquid can be caused to run down the column from tray to tray. Part of the liquid exiting the bottom of the column through line 26 can be introduced to the reboiler sending it back up the column. The remainder is withdrawn as bottom product through line 32. Make-up feed material enter the reboiler at 33.

In operation of the schematic device shown in FIG. 3, once thermal equilibrium has been reached, reflux liquid moving down the column comes into contact with rising vapor in a countercurrent fashion. This, in effect, provides multiple stages of vaporization and condensation. The composition of the distillate exiting line 27 corresponding with the temperature at the top of the column can be a very pure fraction of the vapor. Intermediate composition fractions may be tapped off intermediate points along the column length. All of the various operations are well known to those practicing unit operations in the field of chemical engineering.

The above description of the distillation process, while greatly simplified in the interests of brevity, is adequate to explain two of the problems associated with current equipment and explain the advantages to be obtained from the design approach to be described.

The first problem has to do with tunneling of liquid and vapor through the column structure. This and other forms of maldistribution limits full and effective utilization of the volume available producing a large spread in velocities and residence times for all components of the liquid vapor phases.

The second problem is associated with the degree to which liquid accumulates in the trays and associated contacting point sometimes referred to as "hang up." Clearly, if hang up is large, considerable time will have elapsed before equilibrium is reached between the two phases of liquid and vapor during which continuous operation is established. Pools of the liquid phase also reduce the contacting area between phases and this reduces mass transfer efficiency.

It is thus an object of the present invention to provide a novel distillation column which overcomes the problems inherent in the use of existing equipment design. This and further objects will be more readily apparent when considering the following disclosure and appended claims.

SUMMARY OF THE INVENTION

The present invention is directed to a distillation column for fractionating a liquid feed material in plug flow. The distillation column comprises a feed liquid input and distillate out-put. The column further comprises a core pipe which acts as a mandrel for the helical application of either a series of tubes or vanes. In each instance, the tubes or vanes are applied to a core pipe at angles which are uniform throughout the length of the helically wound members so that interstices created between adjacent layers of tubes or vanes at their points of intersection create interstices which are substantially constant.

DETAILED DESCRIPTION OF THE INVENTION

Figure 1:
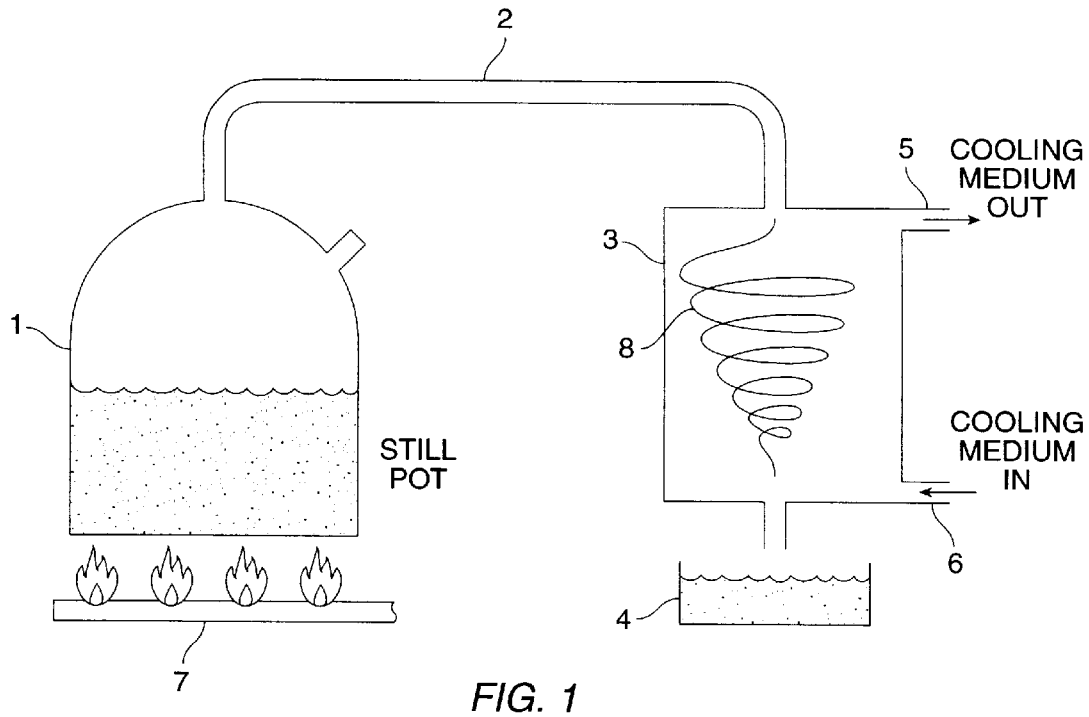
FIGS. 1 to 3 represent schematic representations of equipment used to perform present day distillation operations.
Figure 2:
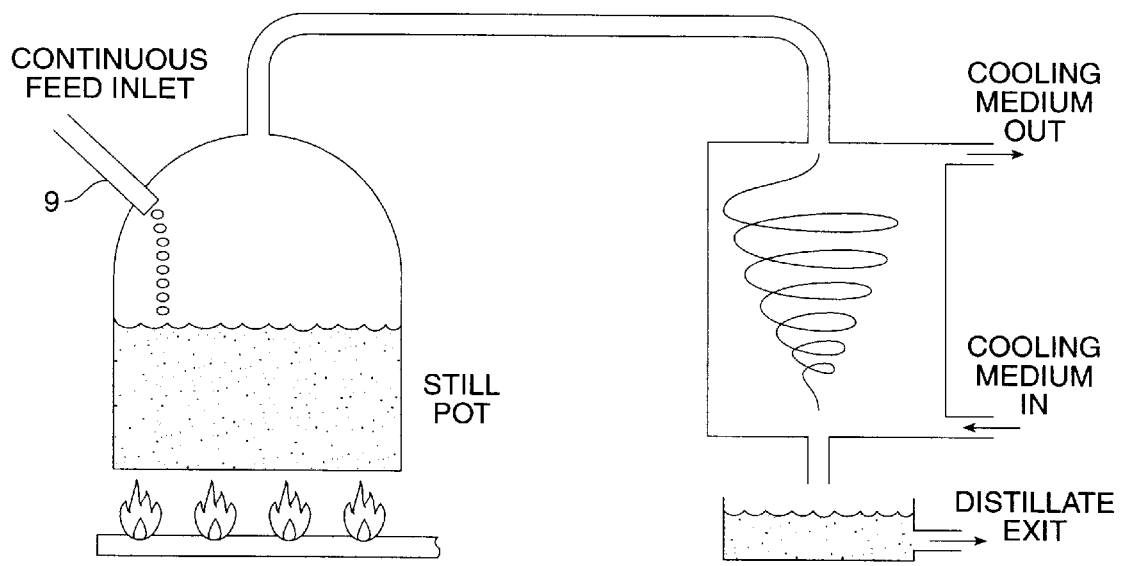
Figure 3:
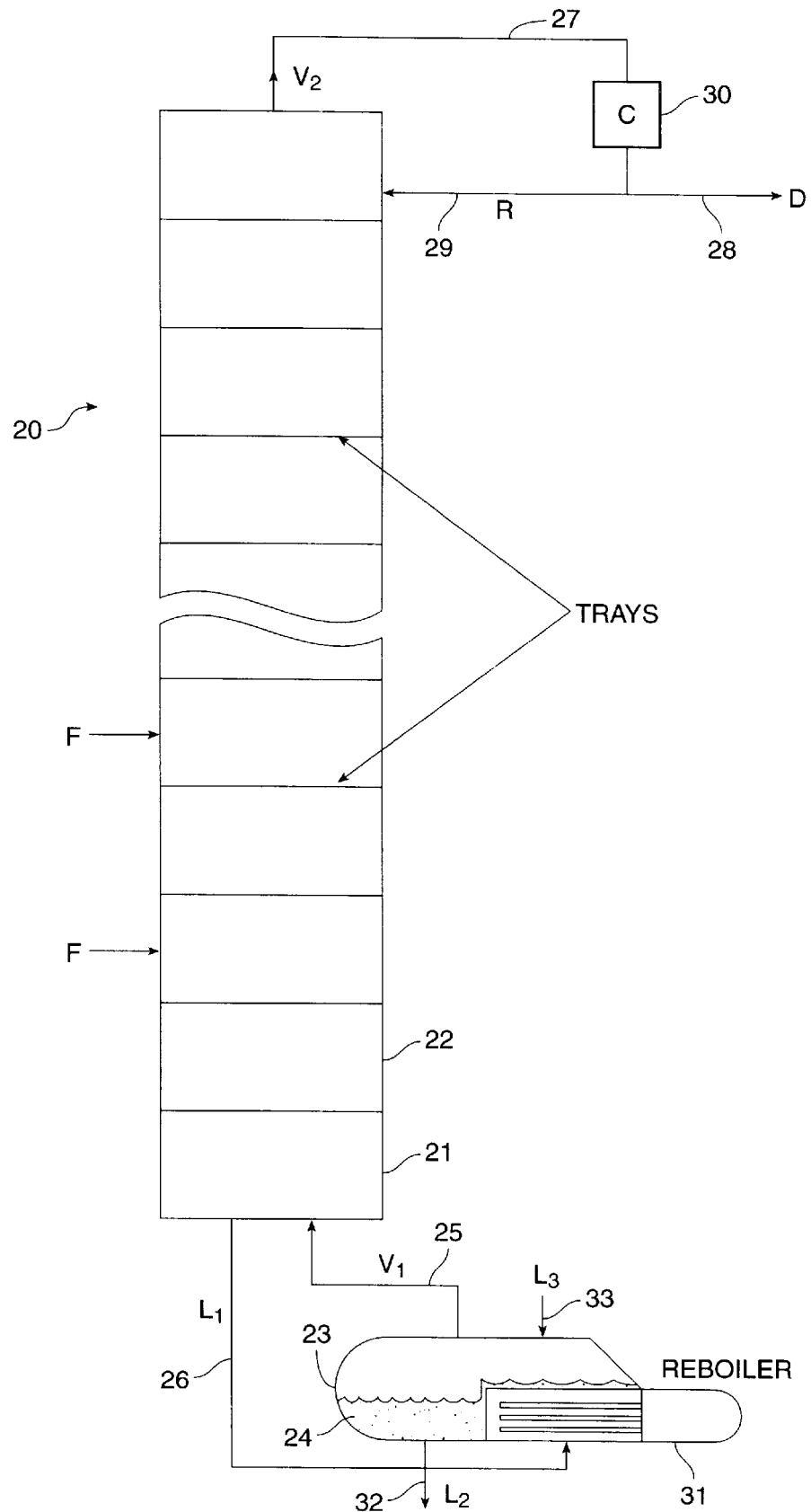
Figure 4:
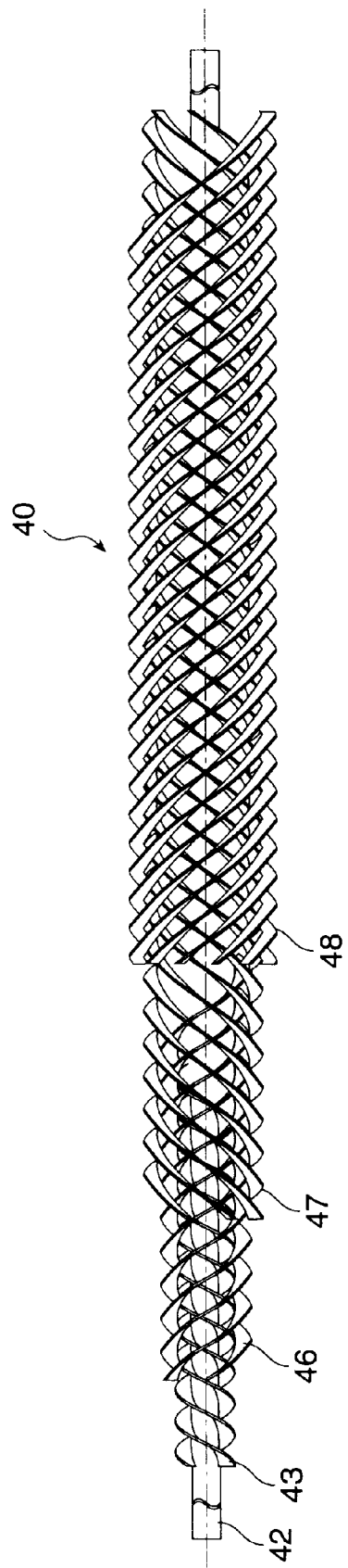
FIGS. 4 and 5 represent side plan views of two embodiments of distillation columns configured for practicing the present invention.

As noted, the present invention differs from the prior art as shown in FIGS. 1 to 3 by the creation of a radically new distillation column. One version of such a column is shown in FIG. 4. This column includes core pipe 42 which acts as a mandrel for the application of a first layer of vanes 43 which, as shown in FIG. 4, are helically wound about core pipe 42, the inner diameter of the first set of vanes 43 being substantially co-extensive with the outer diameter of core pipe 42.

As noted, each of vanes 43 is helically wound about core pipe 42 while maintaining a substantially constant angle to the length of core pipe 42. Ideally, this constant angle is selected as being 45° to the longitudinal axis of the core pipe 42.

In again referring to FIG. 4, additional sets of vanes are shown over core pipe 42 which, again, is used as a mandrel for first set of vanes 43. The second set of vanes 46 is wound about the first set of vanes 43 such that the second set of vanes 46 have an inner diameter substantially coextensive with the outer diameter of the first set of vanes 43. As noted, the vanes of second layer 46 are of a substantially constant angle to core pipe 42 wherein the sign of each layer of vanes 43, 46, 47 and 48 are opposite to the adjacent layer of vanes so that interstices are created between adjacent layers of vanes which are substantially constant along the length of core pipe 42.

Interstices are created at the point of contact between adjacent layers of vanes. If each of said layers of vanes are approximately 45° to the core pipe and are of an opposite sign, interstices between adjacent layers will thus be at a constant approximate 90° angle.

As a preferred embodiment, core pipe 42 can contain a fluid. As such, as long as fluid contained within core pipe 42 is of a temperature distinct from the temperature of a liquid to be distilled, heat transfer can occur through the walls of core pipe 42 thus enhancing the distillation operation.

Figure 5:
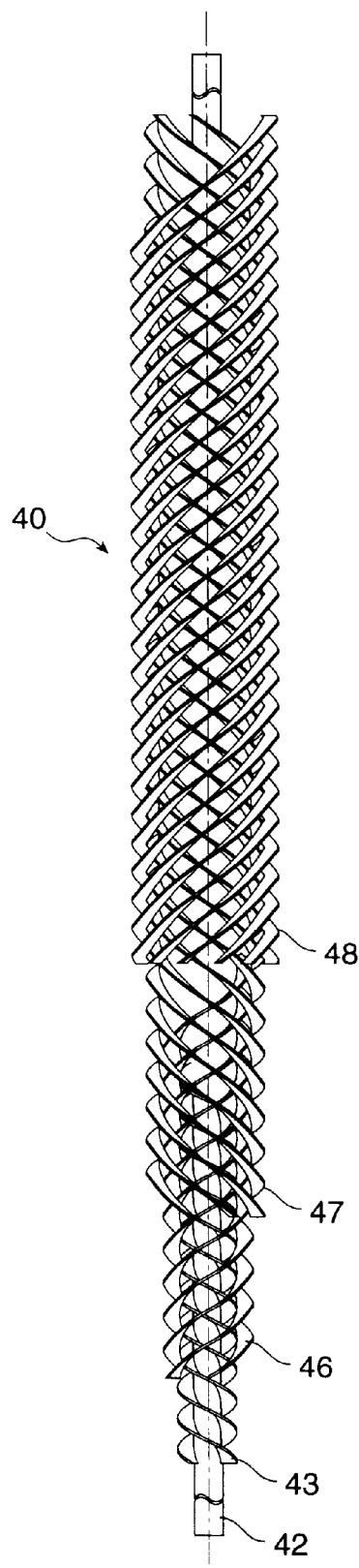

A second embodiment of the present invention is shown in FIG. 5. In this embodiment, core pipe 51 is provided with a series of tubes 52, 53, 54 and 55 which are each helically wound about core pipe 51 and which, as a preferred embodiment, can carry fluids as a heat transfer medium in fine tuning the distillation process.

The addition of multiple and consecutive helically wound layers of tubing about core pipe 51 is shown in FIG. 5. Additionally, tubing 52 is helically wound about core pipe 51 ideally at an approximate 45° angle to the longitudinal axis of the core pipe. Subsequent helical windings of tubing are also installed about core pipe 51 at an approximately 45° angle but of a sign opposite to that of adjacent core pipe windings. As such, where each of the layers of helically wound tubes cross each other, a uniform and consistent approximate 90° angle is achieved throughout the length of the distillation column.

It must be appreciated that when viewing FIGS. 4 and 5, only the internal structure of the respective distillation columns have been depicted. In other words, for the sake of illustrating the present invention, the outer shell or tubing of the distillation column which entraps rising vapor and falling liquid has been eliminated as well as the typical boiler and feed lines as shown in FIG. 3. However, it must be understood that the present invention is intended to function in basically the same environment as prior distillation columns so that, externally, one might not observe any superficial differences between distillation columns produced according to the present invention and those containing the standard perforated trays or plates, again as depicted in FIG. 3.

Replacement of prior art distillation equipment with the present invention is intended to improve the overall distillation process by solving certain fundamental problems inherent in using such equipment. Firstly, the present day distillation columns suffer from tunneling of liquid and vapor through the column structure. This limits full and effective utilization of the volume available producing a large spread in velocities and residence times for all components of the liquid and vapor phases. In addition, the present day distillation process suffers from the fact that liquid accumulates in the trays and associated contacting components which is referred to as "hang up." If hang up is large, considerable time will elapse before equilibrium is reached within the column between the liquid and vapor phases. Pools of the liquid phase also reduce the contacting area between the phases and this reduces mass transfer efficiency.

The present invention produces plug flow so that the residence time for all components is a constant. The present invention provides a uniform distribution of interstices that eliminate tunneling of liquid and vapor. In addition, no hang up regions exist to allow pools of liquid to develop. This assures that a large surface area is maintained between liquid and vapor for good mass transfer. As an added benefit, it was observed that a very low pressure drop exists within the column. Further, as noted above, the embodiment shown in FIG. 5 has the additional advantage that direct temperature control of both the liquid and vapor phase may be exercised by passing a heating and cooling medium through the tubing coils.

In each of the embodiments shown in FIGS. 4 and 5, one must consider the relationship of the strip width or the tubing diameter relative to the diameter of the core mandrel or pipe. This will determine the number of starts required in each layer to develop a uniform distribution of interstices throughout the volume of the structure. As a design example to illustrate the point, the core diameter is defined as dc and the strip width or tubing diameter as w. In this design example, the angle of the winding to the longitudinal axis of the core pipe is selected to be 45°, applicant's preferred embodiment. In appreciation of the example which follows, the following recited terms have indicated meanings:

$L$ = overall length of wound structure
$d_c$ = outside diameter of the core pipe
$w$ = strip width or tubing diameter
$n$ = layer number
$d_n$ = inside diameter of layer of layer n
  = $d_c + 2(n - 1)w$
For a convenient design $d_c = 2w$
Then, $dn = dc + 2(n - 1)w$
  = $2w + 2(n - 1)w = 2nw$
$P_n$ = Pitch of one turn of layer n
  = $\pi \times$ turn inside diameter
  = $\pi \times 2wn$
$N$ = number of turns in each start in length L
  = $L/\pi 2wn$
$T_L$ = length of one turn
  = $\pi \times 2wn \times \sqrt{2}$ when the winding angle is 45°

Therefore, length of each start for all layers = $\sqrt{2} \times L$

If one begins with a 10 inch outside diameter column with a core pipe diameter of 2 inches and a vane width of 1 inch and a distillation column active length of 98 inches, the winding length for all starts is $\sqrt{2} \times 96$ inches. As such, the following relationship is established:

| LAYER NO. | I.D. | TURNS/STARTS | PITCH | STARTS | TURN SEP. |
|---|---|---|---|---|---|
| #1 | 2" | 15.28 | 6.28" | 3 | 2.09" |
| #2 | 4" | 7.64 | 12.57" | 6 | 2.09" |
| #3 | 6" | 5.09 | 18.85" | 9 | 2.09" |
| #4 | 8" | 3.82 | 25.13" | 12 | 2.09" |

In considering the above, it is noted that the turn to turn separation is constant for all adjacent turns and all layers as is required to generate an equal number of interstices throughout the volume of the distillation column. The choice of design parameters available to achieve the same pitch angle for all windings and equal spacing between adjacent turns is extensive. Clearly, the number of starts per layer must be integral but can have values other than those listed in the example above as can the ratio $w/d_c$ in order to produce a constant pitch angle for all windings. Further, the number of layers is not restricted to the value of 4 used in the example.

I claim:

1. A distillation column for fractionating a liquid feed material in plug flow, said distillation column comprising a liquid feed input and distillate output, said column further comprising a core pipe, said core pipe acting as a mandrel for the application of at least first and second layers of vanes, said first layer of vanes being helically wound about said core pipe, the inner diameter of said first layer of vanes being substantially co-extensive with the outer diameter of said core pipe wherein each of said vanes of said first layer being of a substantially constant angle to said longitudinal axis and said second layer of vanes being helically wound about said first layer of vanes such that said second layer of vanes has an inner diameter substantially co-extensive with the outer diameter of said first layer of vanes and the vanes of said second layer being of a substantially constant angle to said core pipe, the angle of each layer of vanes being opposite to the angle of adjacent layer of vanes so that interstices are created between adjacent layers of vanes which are substantially constant along the length of said core pipe and wherein each layer of vanes is at an angle of approximately 45° to said core pipe.

2. The distillation column of claim 1 wherein interstices are created at points of contact between adjacent layers of vanes.

3. The distillation column of claim 2 wherein vanes in adjacent layers form interstices having angles of approximately 90°.

4. A distillation column for fractionating a liquid feed material in plug flow, said distillation column being in a substantially vertical orientation having a top, a bottom, an outer shell and internal components, a liquid feed port for introducing a feed along the column to the interior of said shell, a first exiting line for removing vapor proximate the top of the column, a second exiting line for collecting condensate proximate the bottom of the column, said internal components comprising a core pipe, said core pipe acting as a mandrel for the application of at least first and second layers of vanes, said first layers of vanes being helically wound about said core pipe, the inner diameter of said first layer of vanes being substantially co-extensive with the outer diameter of said core pipe wherein each of said vanes being at equal and uniform angles to said core pipe and said second layer of vanes being helically wound about said first layer of vanes such that said second layer of vanes have an inner diameter substantially co-extensive with the outer diameter of said first layer of vanes and the vanes of said second layer being of a substantially constant angle to said core pipe, the angle of each layer of vanes being opposite to the angle of adjacent layer of vanes so that interstices are created between adjacent layers of vanes which are substantially constant along the length of said core pipe over which said feed, vapor and condensate are caused to contact during distillation.

5. A method of fractionating a liquid feed material into plug flow comprising providing a distillation column being in a substantially vertical orientation having a top, a bottom, an outer shell and internal components, feeding a liquid through a feed port along said column to the interior of said shell, removing vapor proximate the top of said column and collecting condensate proximate the bottom of said column, said internal components comprising a core pipe, said core pipe acting as a mandrel for the application of at least first and second layers of vanes, said first layers of vanes being helically wound about said core pipe, the inner diameter of said first layer of vanes being substantially co-extensive with the outer diameter of said core pipe wherein each of said vanes of said first layer being of a substantially constant angle to said core pipe and said second layer of vanes being helically wound about said first layer of vanes such that said second layer of vanes have an inner diameter substantially co-extensive with the outer diameter of said first layer of vanes and the vanes of said second layer being of a substantially constant angle to said core pipe, the angle of each layer of vanes being opposite to the angle of adjacent layer of vanes so that interstices are created between adjacent layers of vanes which are substantially constant along the length of said core pipe over which said feed, vapor and condensate are caused to contact during distillation.

* * * * *